P. M. CUMMINGS.
Weighing-Scale.
No. 212,092.   Patented Feb. 11, 1879.
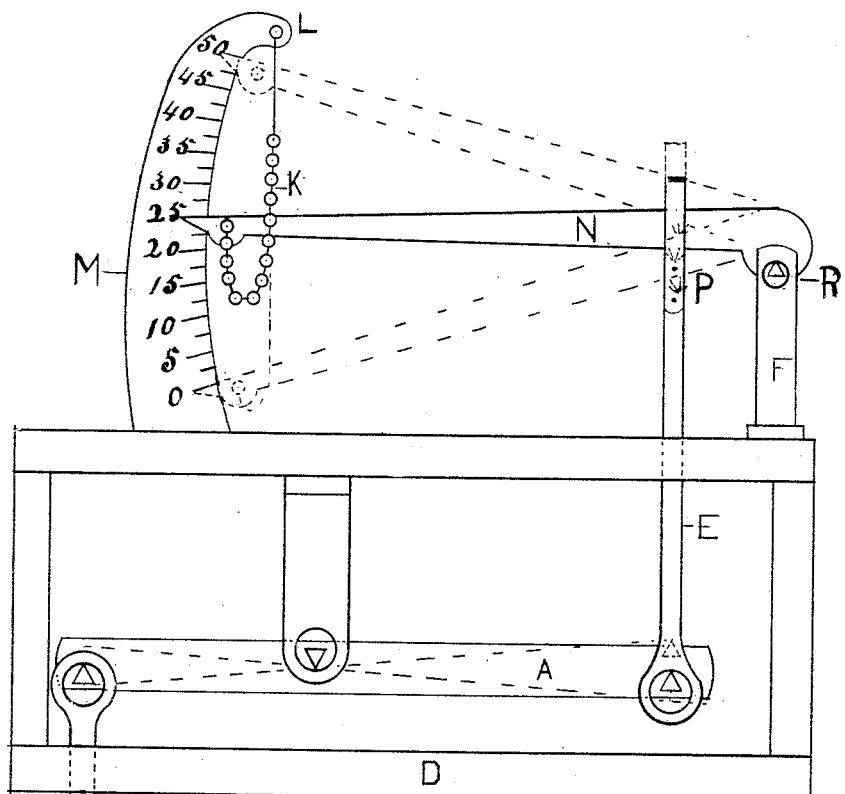
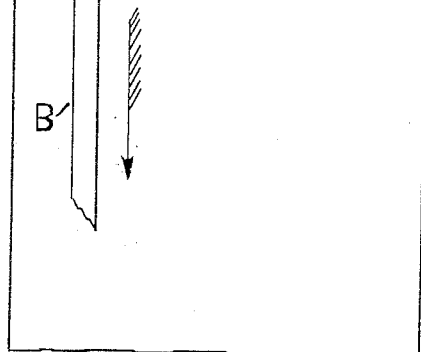
Fig. 1
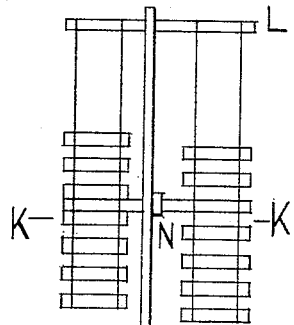
Fig. II
Witnesses
P. B. Howe
W. E. Baldwin
Inventor
Perly Martin Cummings
By W. W. Sanborn Attorney

UNITED STATES PATENT OFFICE.

PERLEY M. CUMMINGS, OF LYONS, IOWA.

IMPROVEMENT IN WEIGHING-SCALES.

Specification forming part of Letters Patent No. 212,092, dated February 11, 1879; application filed December 2, 1878.

*To all whom it may concern:*

Be it known that I, PERLEY M. CUMMINGS, of Lyons city, in the county of Clinton and State of Iowa, have invented certain new and useful Improvements in Weighing-Scales, which improvement is fully set forth in the following specification and accompanying drawings, in which—

Figure 1 represents a side view. Fig. 2 represents an end view, showing the weights and edge of index-plate.

Same letters refer to same parts in both figures.

The object of my invention is to furnish a device by which the weight of an article may be determined without moving a weight on a beam, as is done in the ordinary manner.

This I accomplish in the following way: Taking an ordinary scale, A represents the beam on which the weight is moved; B, the connecting-rod to levers under platform; D, the frame around beam A; E a stud provided at its bottom and top ends with steps to receive a knife-edge bearing; F, a post provided at its top to receive the knife-edge bearing of beam N, as at R, Fig. 1, and N the index or pointer beam, provided with knife-edge bearings, as at P and R.

K represents the weight, made of uniform links or weights, constructed to move with very little friction; M, an index tablet or plate, graduated and numbered.

The weight K is constructed somewhat like a chain. It may be made single or double. I make it double, as shown at K K, Fig. 2. The upper end is suspended from rod L, which rod passes through top of plate M, one part of weight K being on one side of plate M, and the other on the opposite side. I arrange the pieces that form the weight so that the space on one side is opposite a weight on the other. Thus the space of one side is compensated by a weight on the other. The lower end of this chain-weight I attach to a rod which passes through the index-beam N.

It will be readily seen that as the beam N rises it will continually take up more of the weight K, and as it falls it will leave more of it suspended from the stationary point L, as indicated by dotted lines at 0 and 50.

In weighing an article, the beam A is carried down, as indicated by arrow, and the opposite end raises the stud E, which carries up the beam N, the weight being determined by the amount of the chain-weight it takes up. The adjustment to a correct standard will be done with sealed weights in the ordinary way.

The index-beam N may be made with a broad flat point, and move inside the index-plate M, and thus avoid any friction from rubbing against the side.

It will readily be seen that this improvement may be applied to any style of scale.

The great advantage this improvement has is in the saving of time in weighing; for in the ordinary way the weight is moved on the beam, and much time used in balancing and getting just the weight, while by my improvement the exact weight can at once be seen, and thus much valuable time saved.

Having thus fully described my invention, what I claim as new, and desire to secure by Letters Patent, is—

1. In scales for weighing, the self-adjusting weight K, suspended at the upper end from a stationary point, the other end taken up or let out by the movement of the index or pointer beam N, substantially as and for the purpose above set forth.

2. In scales for weighing, in combination with the self-adjusting weight K, the graduated and numbered plate M, substantially as and for the purpose above set forth.

3. In scales for weighing, the arrangement and combination of the self-adjusting weight K, graduated plate M, index-beam N, stud E, and post F, when arranged substantially as and for the purpose above set forth.

PERLEY M. CUMMINGS.

Witnesses:
W. E. BALDWIN,
R. E. GRANT.